United States Patent

Mack

[11] Patent Number: 6,069,351
[45] Date of Patent: May 30, 2000

[54] FOCAL PLANE PROCESSOR FOR SCALING INFORMATION FROM IMAGE SENSORS

[75] Inventor: Walter J. Mack, Chandler, Ariz.

[73] Assignee: Intel Corporation, Santa Clara, Calif.

[21] Appl. No.: 09/118,126

[22] Filed: Jul. 16, 1998

[51] Int. Cl.[7] .................................................. H01L 27/00
[52] U.S. Cl. ...................................... 250/208.1; 348/302
[58] Field of Search ............................. 250/208.1, 214 R; 348/298, 314, 317, 322, 294, 302, 304; 257/291, 443

[56] References Cited

U.S. PATENT DOCUMENTS 5,665,959  9/1997  Fossum et al. ....................... 250/208.1
5,729,008  3/1998  Blalock et al. ....................... 250/208.1
5,841,126  11/1998  Fossum et al. ....................... 250/208.1

*Primary Examiner*—Que T. Le
*Attorney, Agent, or Firm*—Trop, Pruner & Hu, P.C.

[57] ABSTRACT

A focal plane processor, located on the focal plane of an imaging array, allows on-chip imaging and scaling. Computational functions normally achieved by a separate computer may be achieved through the imaging chip itself. This can result in an imager with advanced functionality. Also, additional processing bandwidth provided by the focal plane processor may assist a computer which may receive different image segments from different pixel arrays each having associated focal plane processors.

15 Claims, 3 Drawing Sheets

FOCAL PLANE PROCESSOR FOR SCALING INFORMATION FROM IMAGE SENSORS

BACKGROUND

This invention relates generally to image processors of the type which are located on the focal plane of an imaging array.

The focal plane processor is an image processor which is incorporated into the focal plane. The focal plane is the light sensitive circuit on which the optical array focuses ambient light. An imaging array captures an image which strikes an array of pixel sensors lying on the focal plane. The pixel sensors convert light into electrical signals. Generally, the focal plane is defined by the surface of a semiconductor device which has plurality of light sensitive elements formed thereon to achieve a pixel sensing capability.

While conventional optical pixel sensors have used charged coupled devices (CCD's) and many modern commercial devices use this technology, it has been appreciated that the application of complementary metal oxide semiconductor CMOS technology to imaging sensors could result in an imaging sensor with on-chip computational capabilities. Thus, it has been appreciated that an imaging array could be made on the same process technology as a processor and the two functions, which typically are implemented on separate semiconductor chips, could be incorporated into a single chip. This would offer a number of important advantages including low cost and potentially high computational speed.

Traditionally, imagers include an integrated circuit which receives an electrical signal indicative of the intensity value of the incident radiation. The circuit passes these intensity values on for subsequent image processing. The image processor is typically a digital signal processor which allows various image processing operations to occur. The digital signal processor may in turn be coupled to a microprocessor.

Typically, a relatively small imaging array is utilized for cost reasons. The captured image may then be scaled upwardly in size by interpolating additional intensity values between the actual intensity values determined by the pixel sensors. The more interpolated values that are utilized, the larger the resulting scaled picture. In this way a relatively low cost imaging system may be utilized to achieve a relatively large-sized output display.

Traditionally scaling is done by external computers which are coupled to the image processor. This added computational capability increases the cost of the imaging system.

Thus, there is a continuing need for a low cost imager which provides advanced imaging functions.

SUMMARY

An imager includes a plurality of sensors located on a focal plane. A focal plane processor, also on the focal plane, is coupled to receive intensity information from the sensors. The focal plane processor also interpolates additional intensity information to enable scaling of the image produced by the sensors.

DETAILED DESCRIPTION

Figure 1:
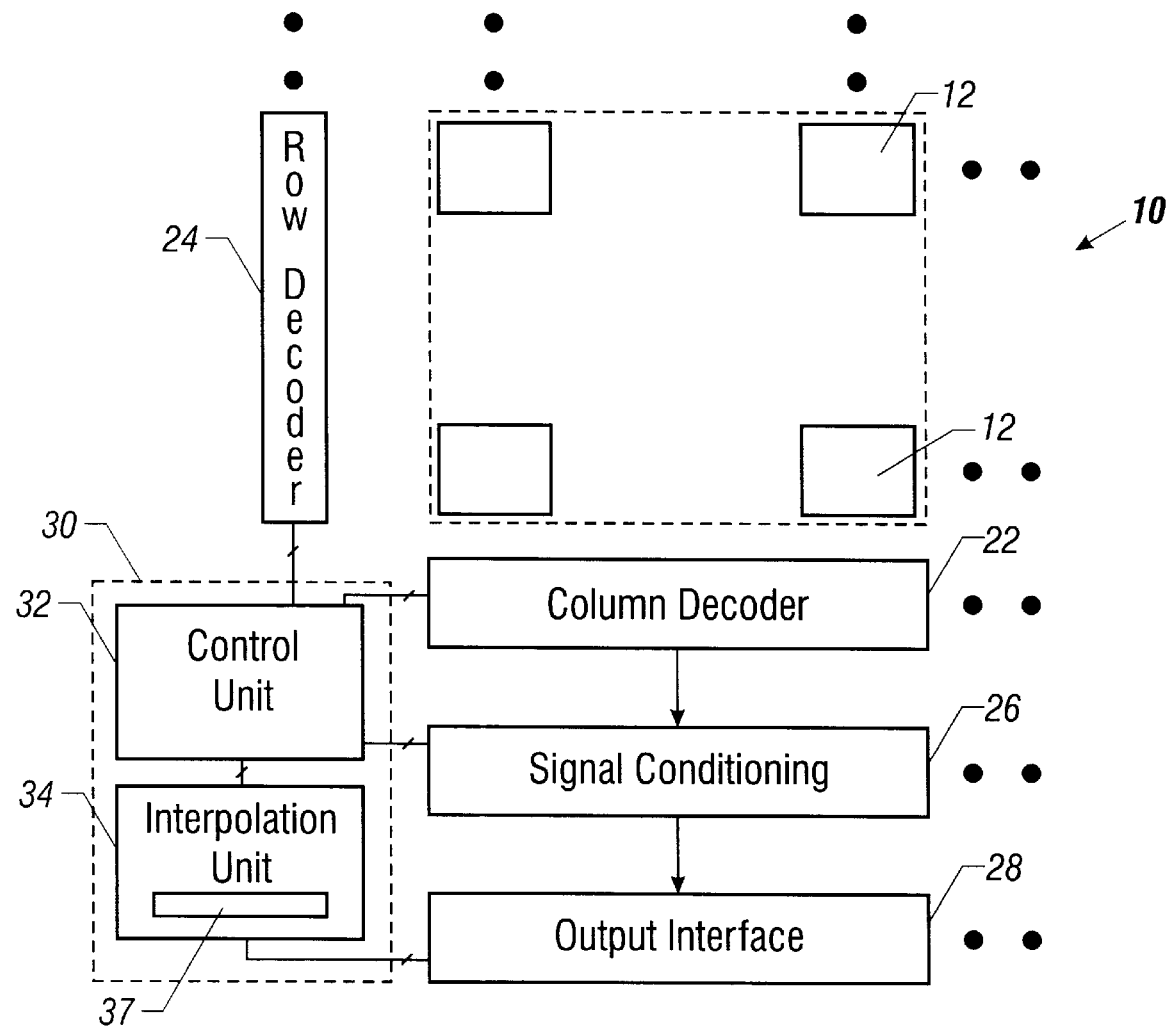
FIG. 1 is a depiction of the focal plane of one embodiment of the present invention.

An imager 10 includes a plurality of image sensors 12 arranged in rows and columns (only two rows and two columns are shown in FIG. 1) and associated decoding and conditioning circuitry. A row decoder 24 and a column decoder 22 are connected to the respective rows and columns of pixel sensors in order to receive intensity information recorded during an integration time interval. The resulting information may be conditioned, in a signal conditioning circuitry 26, and passed to an output interface 28. An on-chip focal plane processor 30 includes a control unit 32 and an interpolation unit 34. The interpolation unit 34 provides focal plane scaling of the intensity value data provided by a limited number of pixel sensors to permit scaling and zoom functions. The imager 10 including the sensors 12, the row decoder 24, column decoder 22, circuitry 26, interface 28 and processor 30 are advantageously all located on a single integrated circuit chip.

The decoders 22 and 24 route the selected sensor indications to signal conditioning circuitry 26 which may include digital-to-analog converters (ADCs) and other circuitry to compensate for noise that is introduced by the sensors. The circuitry 26 may also furnish the resulting data signals to an output interface 28 which includes circuitry for interfacing the imager 10 to other circuitry of an imaging component, such as a digital camera.

Figure 2:
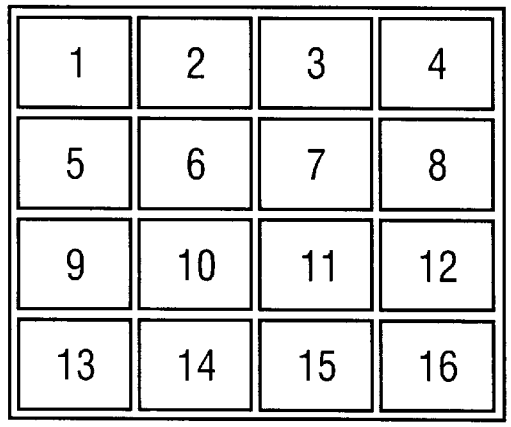
FIG. 2 is a depiction of actual and interpolated pixel values for a two-by-two sensor array.

The control unit 32 coordinates the above described activities of the processor 30. In the illustrated embodiment, a plurality of sensor columns are associated with a control unit 32 and an interpolation unit 34. In this way the interpolation unit can enable focal plane scaling using the available information received from a limited number of pixel sensors. In FIG. 2, a tiling pattern 35 includes tiles 1, 4, 13 and 16, which correspond to the intensity values received from sensors 12 in FIG. 1. Interpolation techniques can be used to obtain the remaining values for tiles 2, 3, 5–12, 14, and 15 shown in FIG. 2.

In this way, the image obtained from the sensors 12 can be expanded to produce a relatively larger resulting image. This allows a relatively inexpensive camera or imager to be utilized to produce a relatively large display.

In prior technology, this scaling was done through an external computer which was not provided on the focal plane. By providing the interpolation unit on the focal plane using a focal plane processor, the advantages of integrated circuit technology may be applied to achieve a relatively low cost imager of very small size with relatively advanced capabilities, such as scaling and zoom.

A variety of interpolation techniques may be utilized to obtain the interpolated intensity information in the processor 10. The interpolation algorithm may be incorporated into the interpolation unit 34 as software or firmware stored in memory on the focal plane, as indicated at 37. The processor 10 and memory 37 together form a computer.

Figure 3:
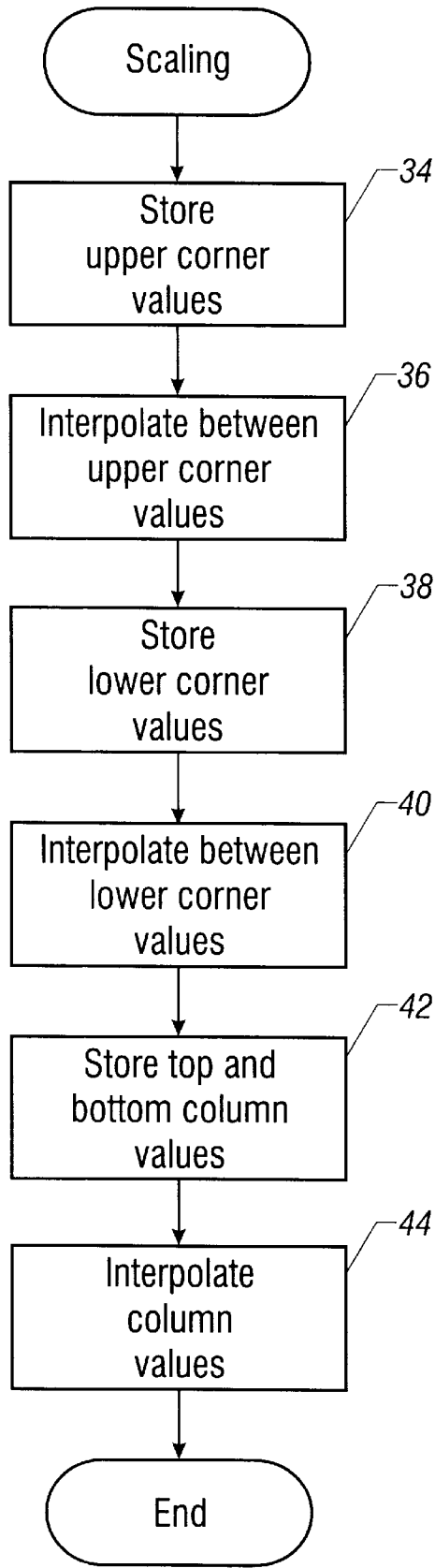
FIG. 3 is a flow diagram showing an interpolation algorithm for the interpolation unit of FIG. 1.

Referring to FIG. 3, the values for the tiles not represented by actual sensed information can be interpolated using a linear interpolation algorithm. Essentially the values for upper corner tiles 1 and 4 may be stored (as indicated in block 34). A linear interpolation is undertaken between the upper corner values (block 36). The values for the lower corner tiles 13 and 16 are then stored (as indicated in block 38) and an interpolation is implemented between the lower corner values, as shown in block 40. Next the top and bottom column values (such as the values for tiles 1 and 13) are stored (block 42). An interpolation is undertaken to derive the values for the tiles in the rows including tiles 5 and 9 (block 44).

The focal plane processor 30, as illustrated in FIG. 1, is associated with a limited number of columns. However a focal plane processor could also be provided for each and every pixel, or a cluster of pixels, for a single row or column or for groups of rows or columns.

Advantageously, the calculations required by focal plane processor are kept relatively simple to facilitate processing with a relatively small sized processor which may be integrated with the pixel sensors. For the illustrated embodiment, the focal plane processor needs sufficient storage to hold several scan lines worth of data which are generated for later output.

If there is not enough capacity on the focal plane to store multiple scan lines of data, a virtual scan line may be calculated by analyzing the pixel values for the left corners tiles 1 and 13 in FIG. 2, for example, and determining a linear interpolation between them for intermediate scan lines. The same process can be used for the values for the right corner tiles 4 and 16. Linear interpolation can then be used to provide the remaining values. If it is feasible to keep two scan lines in memory, this may be advantageous. Then all that is necessary is to determine a vertical step between two pixels, for example, in the top and bottom rows of pixels. The last pixel line off the sensor array is stored and a difference for every column line is applied to achieve an additional line by interpolation. In this way relatively little storage is necessary on the focal plane.

It is also possible to use a single focal plane processor for doing the scaling for an entire device. In such a case, the focal plane processor needs the capability of running multiple operations per elementary readout clock.

In still another embodiment, the interpolation may be done between neighboring pixels. In such a case, there should be adequate storage within each pixel processing unit to implement this method.

While linear interpolation is described herein, higher order interpolation, such as square, cubic, trigonometric, exponential or other functions may be used rather than linear interpolation. These techniques may require a different number of values from the pixel sensors.

Figure 4:
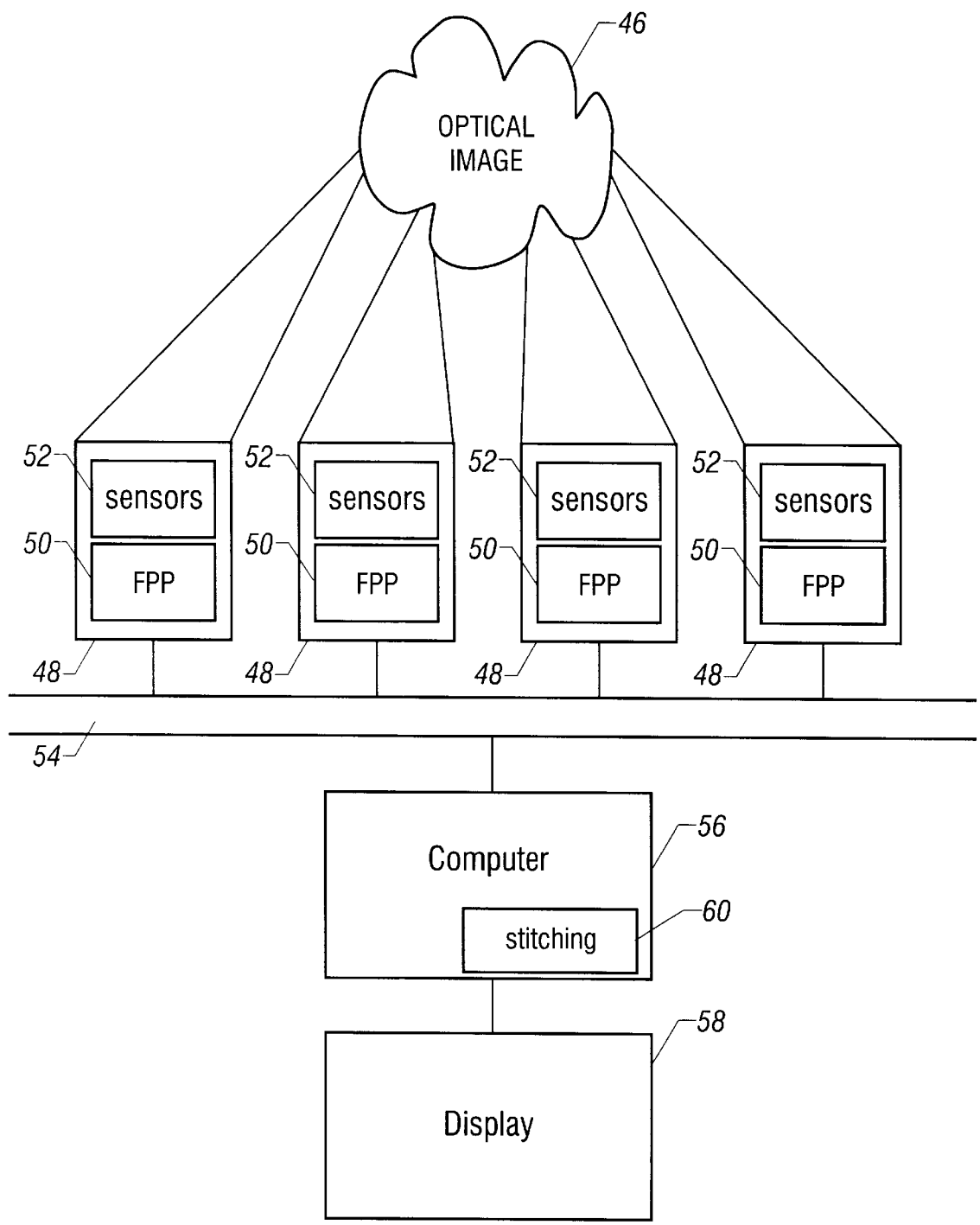
FIG. 4 is a depiction of a digital camera system.

One application for the embodiment described herein involves a large number of cameras 48 connected to one computer 56, as shown in FIG. 4. In this case, a relatively powerful computer may not be able to scale images from each camera in real time. Pushing the scaling into focal plane processors 50 on each camera 48 gives the computer enough bandwidth to process the images in a sophisticated way. Each of the cameras could, for example, capture a portion of an overall depiction using sensors 52 which is stitched together from the images received from each of the cameras.

The image portions produced by the cameras 48 are then passed over a bus 54 to the computer 56. The computer 56 stitches the images from the cameras 40 together to form a composite large sized display 58 using software 60 stored in memory on the computer 56.

In addition the stand alone cameras 40 may have the additional feature of digital focal plane processor zoom, giving advanced functionality at relatively low cost.

In still another application, focal plane processors may directly send video to a monitor. For example, a large number of imagers each using a focal plane processor to provide scaling, can send video to a central surveillance location. The low cost video system may allow security monitoring of a number of sites from a number of low cost imagers each having scaling capabilities.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. An imager comprising:
   a plurality of image sensors located on a focal plane, said sensors converting light into an electrical signal; and
   a focal plane processor, on said focal plane, coupled to said sensors, said processor including an interpolation unit to interpolate information to scale the information from said sensors.

2. The imager of claim 1 wherein said focal plane processor is associated with a group of image sensors arranged in a column.

3. The imager of claim 1 wherein said interpolation unit uses linear interpolation.

4. The imager of claim 1 wherein said interpolation unit takes information from four adjacent sensors and linearly interpolates two values between the values from an upper two adjacent sensors, two values between the values from a lower two adjacent sensors and two rows of four values each between the upper sensors and lower adjacent sensors.

5. The imager of claim 1 wherein said focal plane processor includes a memory storing a program which causes values from four adjacent sensors to be stored and interpolates at least twelve additional values between said stored values.

6. The imager of claim 1 including a plurality of focal plane processors each associated with a group of sensors. said sensors and said processors located on the same focal plane, said processors producing a scaled image from signals from said sensors, said imager including a computer adapted to stitch together the scaled images produced by the focal plane processors.

7. A method of imaging comprising:
   developing a plurality of values from a plurality of image sensors located on a focal plane;
   receiving the values; and
   scaling said values using a focal plane processor on the focal plane.

8. The imaging method of claim 7 including storing a pair of pixel values associated with a pair of adjacent sensors.

9. The method of claim 8 including interpolating between pixel values.

10. The method of claim 9 involving an array of sensors having upper corners and lower corners, including storing a pair of pixel values from a pair of sensors in a lower corner of the array and interpolating between said pixel values.

11. The method of claim 10 including storing pixel values from sensors in opposed upper and lower corners of said array and interpolating between said values.

12. The method of claim 7 including collecting scaled intensity information from a plurality of different imaging devices on the same focal plane.

13. The method of claim 12 including stitching said scaled intensity information together to form a composite image.

14. The method of claim 7 including transferring information from sensors arranged in adjacent columns to said focal plane processor and scaling said information in said focal plane processor.

15. An article comprising a medium for storing instructions that cause a computer to:
   receive a plurality of values from a plurality of image sensors;
   store said values on said focal plane; and
   interpolate, on said focal plane, additional values using said stored values.

\* \* \* \* \*